United States Patent
Motoi et al.

(10) Patent No.: US 8,406,644 B2
(45) Date of Patent: Mar. 26, 2013

(54) IMAGE FORMING APPARATUS WITH TEMPERATURE-BASED COLOR CONTROL

(75) Inventors: Toshihiro Motoi, Toshima-ku (JP); Kenji Yamamoto, Hachioji (JP); Katsunori Takahashi, Hino (JP); Akifumi Isobe, Hidaka (JP); Eiji Nishikawa, Tachikawa (JP); Kosuke Masumoto, Toyokawa (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 272 days.

(21) Appl. No.: 12/829,595

(22) Filed: Jul. 2, 2010

(65) Prior Publication Data

US 2011/0007120 A1    Jan. 13, 2011

(30) Foreign Application Priority Data

Jul. 13, 2009  (JP) ................................. 2009-164389

(51) Int. Cl.
*G03G 15/00* (2006.01)
(52) U.S. Cl. ......................................................... 399/51
(58) Field of Classification Search .................. 399/301, 399/51
See application file for complete search history.

(56) References Cited

U.S. PATENT DOCUMENTS 5,940,114 A * 8/1999 Kataoka et al. ............... 347/248

FOREIGN PATENT DOCUMENTS

| JP | 2000-218860 | 8/2000 |
|---|---|---|
| JP | 2000-263843 | 9/2000 |
| JP | 2001-228672 | 8/2001 |
| JP | 2005-292760 A | 10/2005 |
| JP | 2006-047934 | 2/2006 |
| JP | 2006-184478 | 7/2006 |
| JP | 2007-199211 A | 8/2007 |
| JP | 2008-175966 A | 7/2008 |

OTHER PUBLICATIONS

Office Action issued by Japanese Patent Office on Dec. 12, 2012 in corresponding Japanese Patent Application No. 2009-164389, and English translation thereof.

* cited by examiner

*Primary Examiner* — Quana M Grainger
(74) *Attorney, Agent, or Firm* — Buchanan Ingersoll & Rooney PC

(57) ABSTRACT

In an image forming apparatus that forms a color image by transferring toner images for respective colors formed on plural rotary photoreceptor drums onto a sheet through an intermediate transfer member, when a controller judges that magnification deviation is generated in a main-scanning direction in superposition of the toner images for respective colors, the controller forms a first color registration deviation detecting mark for detecting at least an amount of deviation in the main scanning direction on the intermediate transfer member, and when the controller judges that the magnification deviation is not generated in the main-scanning direction in the superposition of toner images for respective colors, the controller forms a second color registration deviation detecting mark for detecting only an amount of deviation in a sub scanning direction perpendicular to the main-scanning direction on the intermediate transfer member.

4 Claims, 10 Drawing Sheets

SUB SCANNING
DIRECTION

MAIN SCANNING
DIRECTION

IMAGE FORMING APPARATUS WITH TEMPERATURE-BASED COLOR CONTROL

This application is based on Japanese Patent Application No. 2009-164389 filed on Jul. 13, 2009, which is incorporated hereinto by reference.

BACKGROUND OF THE INVENTION

The present invention relates to an image forming apparatus wherein a toner image for each color is formed when each of plural rotating photoreceptor drums is given exposure and is developed, and a color image is formed when the toner image for each color is transferred onto a sheet through an intermediate transfer member.

In the image forming apparatus of this kind, color registration deviation caused in superposition of toner images for respective colors takes place because of various factors, and it is necessary to correct this color registration deviation. However, when correcting the color registration deviation by an exclusive sequence wherein an image forming job is interrupted, productivity of the image forming apparatus is lowered.

Under the aforesaid background, there is known a technology that is called "Inter-sheet color registration correction" for correcting aging color registration deviation caused by temperature rise in an apparatus, without lowering productivity of the image forming apparatus (for example, see Unexamined Japanese Patent Application Publication No. 2005-292760) The Unexamined Japanese Patent Application Publication No. 2005-292760 is purported to be capable of correcting color registration deviation accurately in the course of sheet feeding without interrupting an image forming job, by making a conveyance interval for sheets to be broader than a prescribed interval, then, by forming a mark for detecting color registration deviation at a position corresponding to a point between sheets on an intermediate transfer member, and, by detecting the mark for detecting color registration deviation with a sensor, and by calculating an amount of color registration deviation that has been detected by the sensor.

Further, there is known an image stabilizing control wherein a temperature of an optical element that guides a light beam for exposure scanning to a photoreceptor drum from a light source is detected, and copy operations are interrupted when a temperature difference between the present time and the past is large, and correction of the exposure scanning position for the light beam is carried out (see Unexamined Japanese Patent Application Publication No. 2007-199211). The Unexamined Japanese Patent Application Publication No. 2007-199211 is purported to be capable of conducting the image stabilizing control at appropriated timing to maintain necessary image quality, and thereby to reduce waiting time for a user.

Further, with respect to forming of a mark for detection of color registration deviation between sheets, there has been known an idea to change a length of a pattern of a color registration deviation detecting mark based on an inner temperature of an image forming apparatus that is a dominant cause for color registration deviation (see Unexamined Japanese Patent Application Publication No. 2008-175966). The Unexamined Japanese Patent Application Publication No. 2008-175966 is purported to be able to reduce the consumption volume of toner in the case of correction of color registration deviation, and to realize a reduction of an amount of time required for correction.

Now, color registration deviation caused in superposition of toner images for respective colors is generated in the direction that is in parallel with the conveyance direction for sheets (sub-scanning direction), and in the direction that is perpendicular to the sheet conveyance direction, and a type of a color registration deviation detecting mark to be formed varies, depending on the direction of the color registration deviation to be corrected.

A size in the sub-scanning direction of the color registration deviation detecting mark to be formed for correcting color registration deviation in the direction perpendicular to sub-scanning direction (main-scanning direction) is larger than that of the color registration deviation detecting mark to be formed for correcting color registration deviation in the sub-scanning direction, and an amount of toner to be needed is larger. Therefore, the time required for correction for correcting color registration deviation in the main scanning direction is longer than the time required for correcting color registration deviation in the sub-scanning direction, and toner in large quantities is not avoided.

Therefore, it is preferable that a color registration deviation detecting mark is formed for correcting color registration deviation in the main scanning direction only when color registration deviation in the main-scanning direction takes place, and a color registration deviation detecting mark for correcting only color registration deviation in the sub-scanning direction is formed when no color registration deviation in the main-scanning direction takes place.

The invention has been achieved in view of the aforesaid problems, and its object is to provide an image forming apparatus wherein the time required for correction for correcting color registration deviation is short, and the consumption volume of toner is less.

SUMMARY OF THE INVENTION (1) To achieve the abovementioned object, an image forming apparatus reflecting one aspect of the present invention is an image forming apparatus that forms a color image by transferring toner images for respective colors formed on plural rotating photoreceptor drums onto a sheet through an intermediate transfer member, that comprises plural exposure sections which form electrostatic latent images on plural photoreceptor drums respectively, image forming sections that respectively form toner images for respective colors by visualizing the electrostatic latent images formed by plural exposure sections, an intermediate transfer section that transfers toner images for respective colors formed by the image forming sections onto the intermediate transfer member through superposition and a controller that controls operations of at least plural exposure sections, wherein the controller judges whether magnification deviation takes place or not in the main-scanning direction in superposition of toner images for respective colors, and when the magnification deviation is judged to take place in the main-scanning direction in superposition of toner images for respective colors, the first color registration deviation detecting mark for detecting at least an amount of deviation in the main scanning direction is formed on the intermediate transfer member, and when the magnification deviation is judged not to take place in the main-scanning direction in the superposition of toner images for respective colors, the second color registration deviation detecting mark for detecting only an amount of deviation in the sub scanning direction is formed on the intermediate transfer member.

(2) In the image forming apparatus in the aforesaid item (1), it is preferable that a plurality of temperature sensors which measure temperatures of the plural exposure sections are further provided, and when a temperature difference between plural exposure sections measured by the aforesaid temperature sensors is greater than the prescribed threshold value, the controller judges that magnification deviation in the main-scanning direction takes place in the superposition of toner images for respective colors, and when a temperature difference between plural exposure sections measured by the aforesaid temperature sensors is less than the prescribed threshold value, the controller judges that the magnification deviation in the main-scanning direction does not take place in the superposition of toner images for respective colors.

(3) In the image forming apparatus in the aforesaid item (1) or (2), it is preferable that the second color registration detecting mark is formed by the controller at a position corresponding to in-between sheets on the aforesaid intermediate transfer member while practicing an image forming job to form an image on a sheet when forming the second color registration deviation detecting mark, and the first color registration deviation detecting mark is formed after interrupting image forming job when forming the aforesaid first mark.

(4) In the image forming apparatus in the aforesaid item (2), it is preferable that the aforesaid controller establishes either one of the aforesaid plural exposure sections to be a reference exposure section, and judges that magnification deviation occurs in the main scanning direction in superposition of toner images for respective colors, when at least one of temperature differences between the aforesaid reference exposure section and all other exposure sections is larger than a prescribed threshold value, and judges that magnification deviation does not occur in the main scanning direction in superposition of toner images for respective colors, when all of temperature differences between the reference exposure section and all other exposure sections are less than the prescribed threshold value.

(5) In the image forming apparatus in the aforesaid item (2), it is preferable that the controller obtains the maximum value and the minimum value of temperatures of aforesaid exposure sections measured by respective temperature sensors, and judges that magnification deviation occurs in the main scanning direction in superposition of toner images for respective colors when a temperature difference between the maximum value and the minimum value is larger than a prescribed threshold value, and judges that magnification deviation does not occur in the main scanning direction in superposition of toner images for respective colors when a temperature difference between the maximum value and the minimum value is less than the prescribed threshold value.

Each of FIGS. 6A-6H is a diagram showing binarization processing of image detection signal S2 in the case when the first color registration deviation detecting mark CR1 is detected by color registration sensor 49a.

Figure 7:
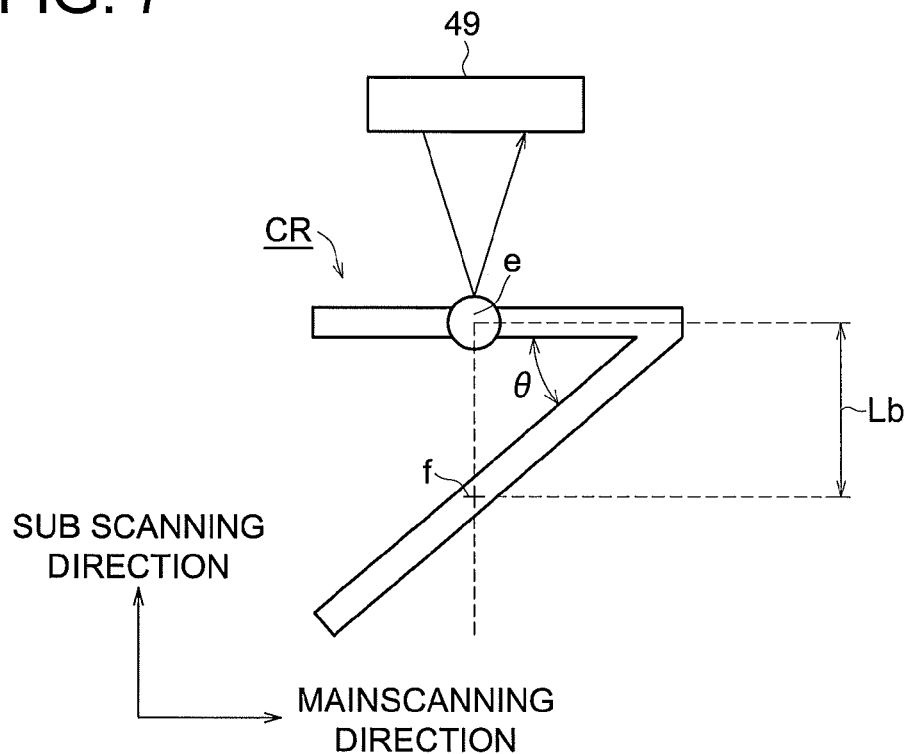

FIG. 7 is a diagram showing an example of relationship between the first color registration deviation detecting mark CR1 and color registration sensor 49a.

Figures 8A, 8B:
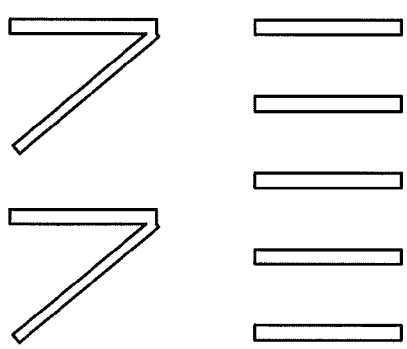

FIG. 8A is a plan view wherein a part of the first color registration deviation detecting mark CR1 is enlarged, and FIG. 8B is a plan view wherein a part of the second color registration deviation detecting mark CR2 is enlarged.

Figure 9:
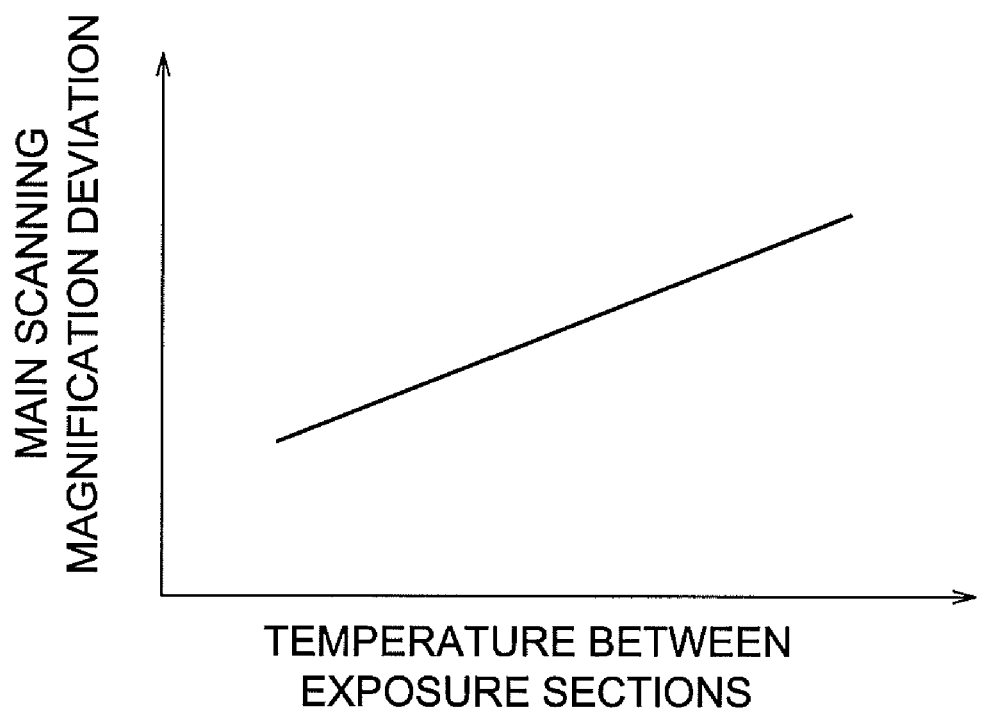

FIG. 9 is a graph showing relationship between temperature differences among exposure sections 2Y, 2B, 2C and 2K and magnification deviation in the main scanning direction.

Figure 10A:
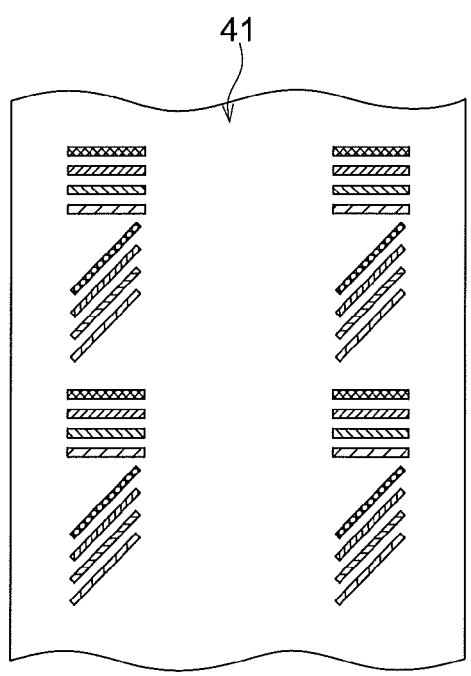
Figure 10B:
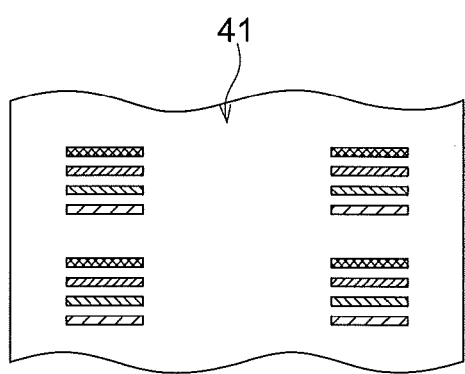

FIG. 10A is a plan view showing another example of a form of the first color registration deviation detecting mark CR1, and FIG. 10B is a plan view showing another example of a form of the second color registration deviation detecting mark CR2.

Figure 1:
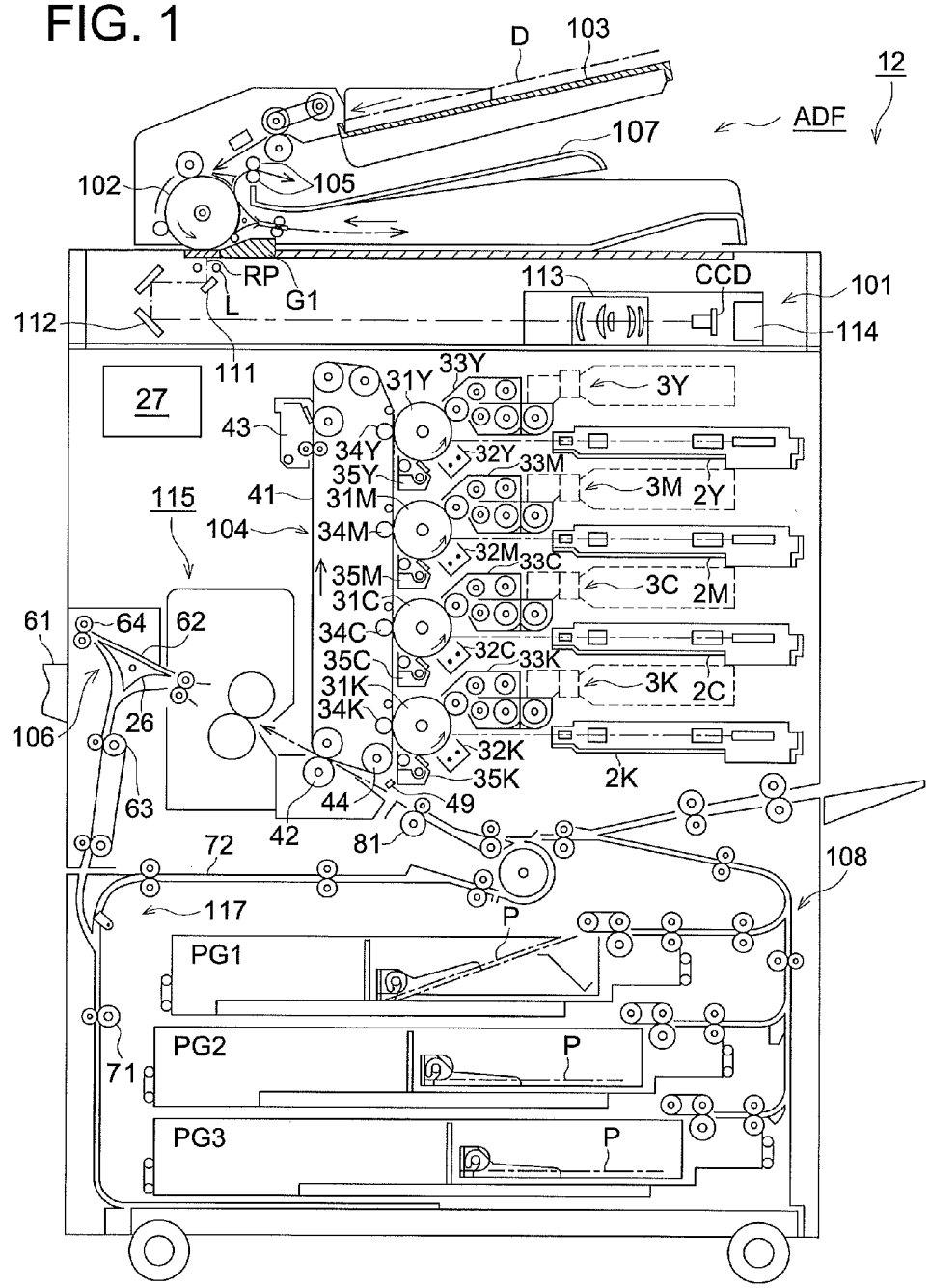
FIG. 1 is a conceptual diagram showing an example of construction of image forming apparatus 12 serving as an embodiment of the invention.
Figure 11:
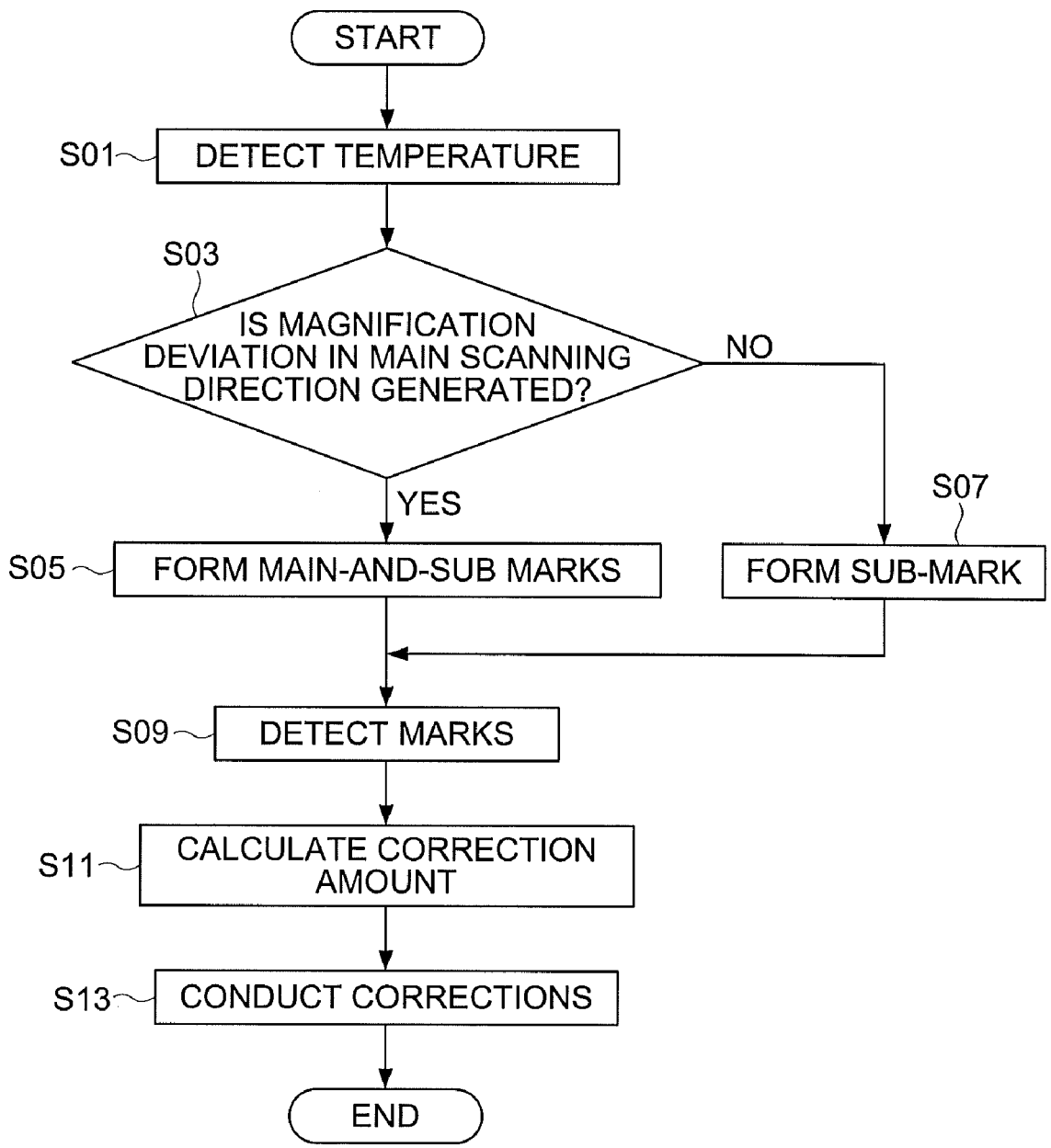

FIG. 11 is a flow chart showing an example of forming and controlling methods CR1 and CR2 in the image forming apparatus in FIG. 1.

DETAILED DESCRIPTION OF THE PREFERRED EMBODIMENT

An embodiment of the invention will be explained as follows, referring to the drawings. In the description of the drawings, the same symbols are given to the same portions to omit the explanation.

The whole construction of the image forming apparatus relating to an embodiment of the invention will be explained as follows, referring to FIG. 1. Image forming apparatus 12 relating to an embodiment of the invention is one called a color image forming apparatus of a tandem type that forms a full color image in which a plurality of photoreceptor drums 31Y, 31M, 31C and 31K are arranged to face intermediate transfer belt 41 representing an example of an intermediate transfer member.

The image forming apparatus 12 is equipped, on its upper portion, with an automatic document feeder ADF. Document D placed on document platen 103 of the automatic document feeder ADF is separated to be a sheet to be fed out, and is conveyed by conveyance drum 102.

Images of document D are read by document reading section 101 at document image reading position RP, while the document is conveyed. First conveyance guide G1 and document ejection roller 105 eject document D that has been read to document ejection tray 107.

The image forming apparatus 12 is composed of document reading section 101, exposure sections 2Y, 2M, 2C and 2K, image forming sections 3Y, 3M, 3C and 3K, intermediate transfer member 104, fixing section 115, sheet ejection and reversing section 106, sheet re-feeding section 117, sheet feeding section 108 and of controller 27, which are installed in one casing.

In the document reading section 101, an image of document D is illuminated by lamp L at document image reading position RP, and its reflected light is led by first mirror unit 111, second mirror unit 112 and lens 113, to form an image on a light-receiving surface of image pickup device CCD. The image pickup device CCD conducts photoelectric conversion for the light entered the image pickup device CCD, and outputs prescribed image signals. For these image signals, image reading controller 114 conducts processing such as A/D conversion, shading correction and compression, and stores the image signals in a storage section of the controller 27 as image data. For the image data stored in the storage section, appropriated image processing is conducted based on the conditions established by a user, and output image data are generated.

Each of the exposure sections 2Y, 2M, 2C and 2K is composed of an unillustlated semiconductor laser light source, a polygon mirror and of plural lenses, and it emits a laser beam. Each of the exposure sections 2Y, 2M, 2C and 2K conduct scanning exposure on a surface of each of photoreceptor drums 31Y, 31M, 31C and 31K charged by main charging sections 32Y, 32M, 32C and 32K, corresponding to output information outputted based on outputted image data sent from the controller 27.

For example, in the exposure section 2Y, a laser beam is subjected to bias scanning under rotation of the polygon mirror for Y color. This is so-called writing in the main scanning direction of image data for Y color. The main scanning direction is a direction that is in parallel with a rotational shaft of photoreceptor drum 31Y. The photoreceptor drum 31Y rotates in the sub scanning direction. The sub scanning direction is a direction that is perpendicular to the rotational axis of photoreceptor drum 31Y. When the photoreceptor drum 31Y rotates in the sub scanning direction, and when the laser beam is used for bias scanning, an electrostatic latent image for Y color is formed on photoreceptor drum 31Y. For M color, C color and BK color, electrostatic latent images for M color, C color and BK color are formed respectively on photoreceptor drums 31M, 31C and 31K in the same way as in the foregoing. when a laser beam is used for scanning in the direction (main scanning direction) that is in parallel with rotational axis of each of rotating photoreceptor drums 31M, 31C and 31K.

The image forming section 3Y is composed of photoreceptor drum 31Y and of main charging section 32Y, developing section 33Y, first transfer roller 34Y and cleaning section 35Y which are arranged on the circumference of the photoreceptor drum 31Y. Other image forming sections 3M, 3C and 3K are the same as the image forming section 3Y in terms of construction, and main charging sections 32M, 32C and 32K, developing sections 33M, 33C and 33K, first transfer rollers 34M, 34C and 34K and cleaning sections 35M, 35C and 35K are arranged, respectively on the circumferences of photoreceptor drums 31M, 31C and 31K.

Each of developing sections 33Y, 33M, 33C and 33K develops a latent image on each of photoreceptor drums 31Y, 31M, 31C and 31K with each of toners of yellow (Y), magenta (M), cyan (C) and black (BK) to be visible images. Owing to this, a yellow (Y) toner image, a magenta (M) toner image, a cyan (C) toner image and a black (BK) toner image are formed, respectively on photoreceptor drums 31Y, 31M, 31C and 31K.

First transfer rollers 34Y, 34M, 34C and 34K of intermediate transfer section 104 transfer toner images formed respectively on photoreceptor drums 31Y, 31M, 31C and 31K to be superposed onto a prescribed position. When toner images for respective colors are superposed, a color image is formed on intermediate transfer belt 41. Cleaning sections 35Y, 35M, 35C and 35K remove toners remaining respectively on surfaces of photoreceptor drums 31Y, 31M, 31C and 31K which have been finished in terms of transfer of toner images.

On the other hand, second transfer roller 42 transfers a color image transferred to be superposed onto intermediate transfer belt 41 onto sheet P that has been conveyed from trays PG1, PG2 and PG3 of sheet feeding section 108 and has been fed out after being synchronized by sheet feeding roller 81. Belt cleaning section 43 cleans a surface of intermediate transfer belt 41 that has finished transferring onto sheet P of color image, and the cleaned intermediate transfer belt 41 is used for succeeding image transfer.

Sheet P carrying toner images is sent to fixing section 115, and the fixing section 115 causes a toner image to be fixed on the sheet P, by increasing pressure for sheet P and by heating sheet P.

Sheet ejection and reversing section 106 conveys sheet P that has finished fixing processing by fixing section 115, and ejects the sheet P to sheet ejection tray 61. When ejecting sheet P by reversing inside out, sheet ejection guide 62 leads the sheet P downward once, then, the sheet P is reversed and conveyed after the trailing edge of sheet P is interposed by sheet ejection reversing roller 63, and the sheet P is led by sheet ejection guide 62 to sheet ejection roller 64 to be ejected.

Incidentally, when an image is formed also on the back of sheet P, sheet ejection guide 62 conveys the sheet P that has finished in terms of fixing processing for toner image on a surface to sheet re-feeding section 117 positioned at a lower part, and the sheet P is caused to be fed in an opposite way to be reversed after the trailing edge of sheet P is caused to be interposed by sheet re-feeding reversing roller 71, thus, the sheet P is fed out to sheet re-feeding conveyance path 72 to be ready for image forming on the back of sheet P.

In the image forming apparatus 12, photoreceptor drums 31Y, 31M, 31C and 31K rotate in the direction shown with an arrow in FIG. 1. Then, intermediate transfer belt 41 that is composed of an endless belt moves while being rotated in the direction shown with an arrow in FIG. 1 by the drive force of belt drive roller 44. Color registration sensor 49 is arranged for intermediate transfer belt 41 located between photoreceptor drum 31K and second transfer roller 42. The color registration sensor 49 detects a color registration deviation detecting mark formed on intermediate transfer belt 41 for correcting color registration deviation. Details of the color registration deviation detecting mark will be described later.

Examples of the construction for exposure section 2Y for Y color and for skew adjusting device 9Y for the exposure section 2Y will be explained, referring to FIG. 2. The exposure section 2Y for Y color shown in FIG. 2 has therein semiconductor laser light source 51, collimator lens 52, auxiliary lens 53, polygon mirror 54, polygon motor 55, f(θ) lens 56, CY1 lens 57 for forming image on mirror surface, CY2 lens 58 for forming image on drum surface, reflecting plate 59, polygon motor drive board 65 and LD drive board 66.

The semiconductor laser light source 51 is connected to the LD drive board 66 for Y color. Entry data Wy from the exposure section 2Y are supplied to the LD drive board 66. On the LD drive board 66, the entry data Wy are PWM-modulated, and laser drive signal SLy with a prescribed pulse width after PWM modulation are outputted to semiconductor laser light source 51. On the semiconductor laser light source 51, a laser beam is generated based on laser drive signal SLy for Y color. A laser beam emitted from the semiconductor laser light source 51 is formed to be a prescribed beam of light by the collimator lens 52, the auxiliary lens 53 and by CY1 lens 57.

This beam of light is deflected in the main-scanning direction by polygon mirror 54. For example, the polygon mirror 54 is driven by polygon motor 55. The polygon motor 55 is connected to polygon drive board 65 to which Y polygon CLK is supplied from controller 27 described earlier. The polygon drive board 65 causes the polygon motor 55 to rotate at a prescribed rotational speed based on Y polygon CLK. The beam of light deflected by polygon mirror 54 is caused by f(θ) lens 56 and CY2 lens 58 to form an image toward photoreceptor drum 31Y. Owing to this action, electrostatic latent images such as toner image for Y color based on output image data which are read by document reading section 101 and are subjected to appropriate image processing, and as a toner image of color registration deviation detecting mark, are formed.

On this exposure section 2Y, there is provided skew adjusting device 9Y. The skew adjusting device 9Y is attached on a main body section. On this main body section, there is provided reflecting plate 59, and on a position facing the reflecting plate 59, there is attached laser index sensor 67. The laser index sensor 67 detects a beam of light deflected by polygon mirror 54, and outputs Y-INDEX signals to controller 27.

The skew adjusting device 9Y has therein adjustment gear unit 21 and motor for adjustment 22. On the adjustment gear unit 21, there is attached CY2 lens 58. The adjustment gear unit 21 is attached to be movable freely for CY2 lens 58. Motor 22 for adjustment moves adjustment gear unit 21 in the vertical direction for adjustment based on skew adjustment signal SSy.

Further, exposure section 2Y is equipped with a temperature sensor (not shown) that measures temperature of an optical member that leads a laser beam emitted from semiconductor laser light source 51 to photoreceptor drum 31Y, or temperature of a circumference of the optical member. In a concrete form, the temperature sensor is arranged to measure temperature of at least one of collimator lens 52, auxiliary lens 53, CY1 lens 57, polygon mirror 54, f(θ) lens 56 and CY2 lens 58 or of its circumference.

Figure 2:
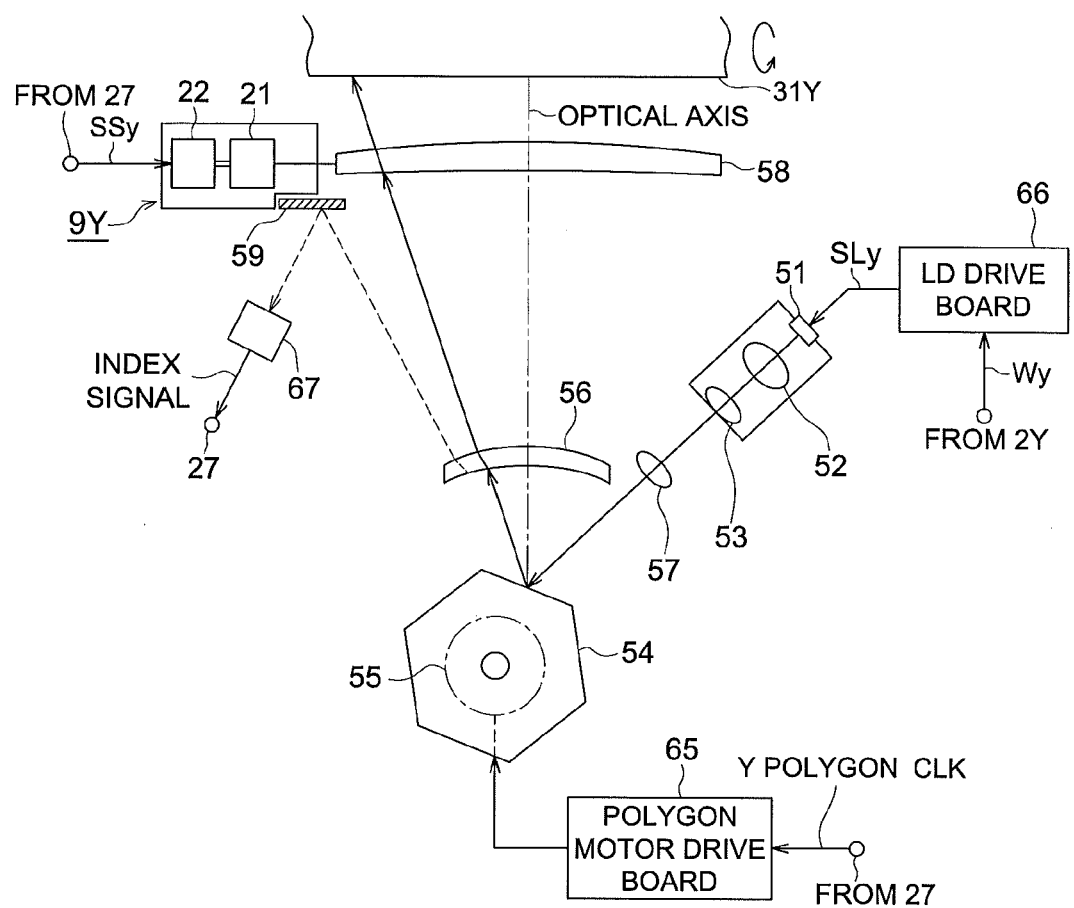
FIG. 2 is a conceptual diagram showing an example of constructions of exposure section 2Y for Y color in FIG. 1 and of its skew adjustment device 9Y.

Incidentally, since exposure sections 2M, 2C and 2K and also their skew adjustment devices for other colors are the same as those in FIG. 2 in terms of constructions, explanations for them are omitted.

Figure 3:
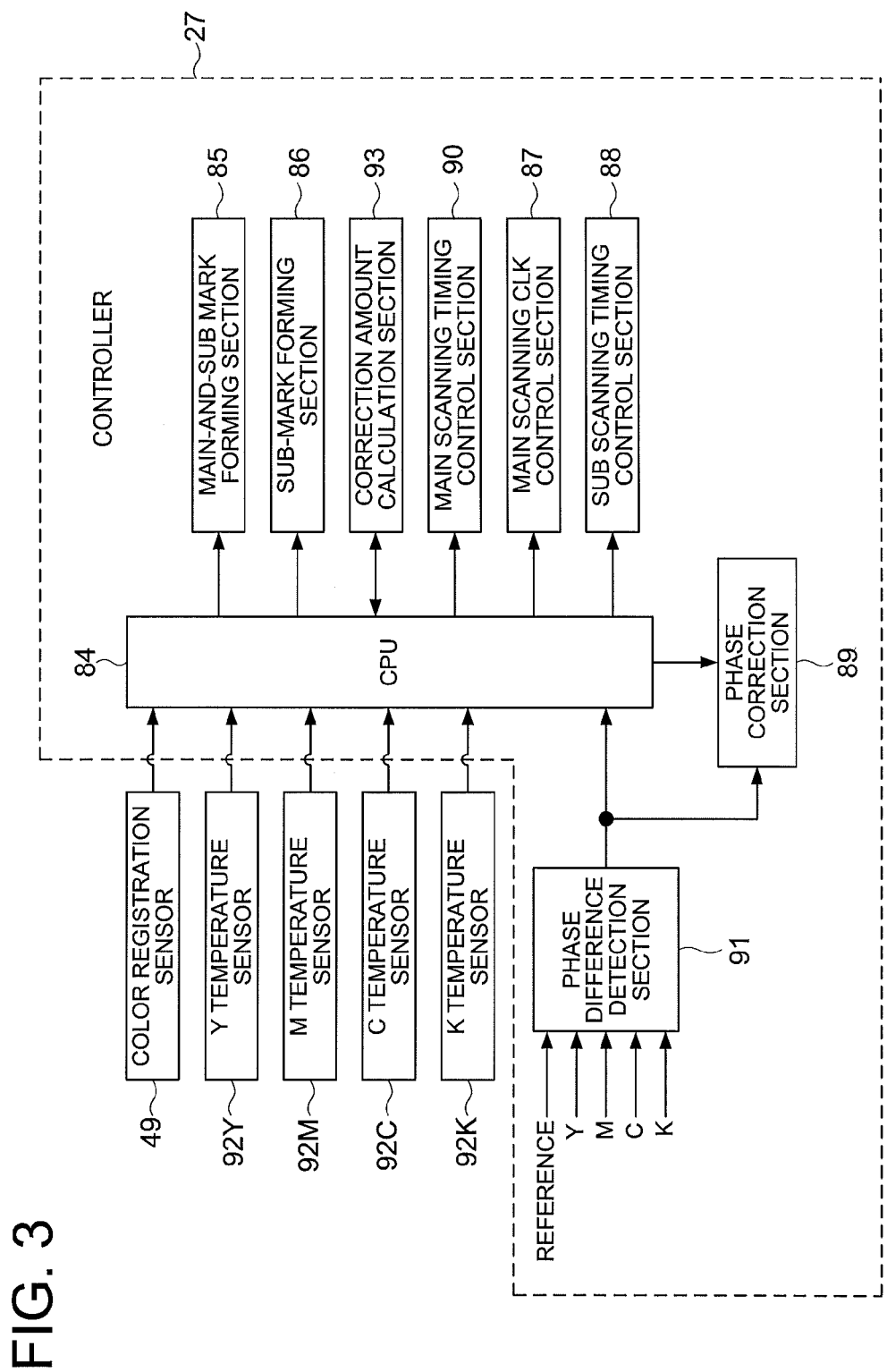
FIG. 3 is a block diagram showing an example of construction of controller 27 in FIG. 1.

An example of the construction of controller 27 in FIG. 1 will be explained as follows, referring to FIG. 3. The controller 27 is equipped with CPU 84 that functions as a judging section that judges whether magnification deviation is generated in the main scanning direction or not in superposition of toner images for respective colors, main-and-sub mark forming section (first mark forming section) 85 that forms first color registration deviation detecting mark for detecting an amount of deviation in at least main scanning direction on intermediate transfer belt 41, when CPU 84 judges that magnification deviation is caused in main scanning direction in superposition of toner images for respective colors, sub-mark forming section (second mark forming section) 86 that forms second color registration deviation detecting mark for detecting only an amount of deviation in the sub scanning direction on intermediate transfer belt 41, when CPU 84 judges that magnification deviation is not caused in the main scanning direction in superposition of toner images for respective colors, correction amount calculating section 93 that calculates an amount of correction for color registration deviation in the main scanning direction and sub scanning direction from detection timing for detecting mark for color registration deviation by color registration sensor 49, main scanning timing controller 90 that controls image forming timing in the main scanning direction based on the calculated amount of correction, main scanning CLK controller 86 that controls polygon CLK inputted in polygon motor drive board 65 in FIG. 2 based on the calculated correction amount, sub scanning timing controller 87 that controls image forming timing in the sub scanning direction based on the calculated amount of correction, phase difference detecting section 91 that detects phase difference of polygon mirror 54 for respective colors and phase correction section 89 that corrects a phase difference detected by phase difference detecting section 91.

CPU 84 judges whether magnification deviation is generated in the main scanning direction or not from temperatures of respective exposure sections 2Y, 2M, 2C and 2K detected by temperature sensors 92Y, 92M, 92C and 92K for respective colors. Concretely, when temperature differences among plural exposure sections 2Y, 2M, 2C and 2K which are measured by respective temperature sensors 92Y, 92M, 92C and 92K are greater than a prescribed threshold value, magnification deviation is judged to be generated in the main scanning direction in superposition of toner images for respective colors, while, when temperature differences for plural exposure sections 2Y, 2M, 2C and 2K measured by temperature sensors 92Y, 92M, 92C and 92K are less than a prescribed threshold value, magnification deviation is judged not to be generated in the main scanning direction in superposition of toner images for respective colors. In this case, "temperature differences for plural exposure sections 2Y, 2M, 2C and 2K" show temperature differences for optical members which are equipped on plural exposure sections 2Y, 2M, 2C and 2K.

Main scanning CLK controller 87 controls polygon CLK inputted in polygon motor drive board 65 in FIG. 2.

Though the first color registration deviation detecting mark formed by the main-and-sub mark forming section 85 is a mark for detecting magnification deviation at least in the main scanning direction in superposition of toner images for respective colors, an occasion wherein a mark can detect magnification deviation in the main scanning direction and color registration deviation in the sub scanning direction can be detected simultaneously will be explained in the present embodiment. On the other hand, second color registration deviation detecting mark formed by sub-mark forming section 86 is a mark for detecting only color registration deviation in the sub scanning direction, and the magnification deviation in the main scanning direction cannot be detected.

Examples of construction for the first color registration deviation detecting mark CR1 formed by main-and-sub mark forming section 85 in FIG. 3 and for the second color registration deviation detecting mark CR2 formed by sub-mark forming section 86 in FIG. 3 will be explained as follows, referring to FIGS. 4A and 4B.

Figure 4:
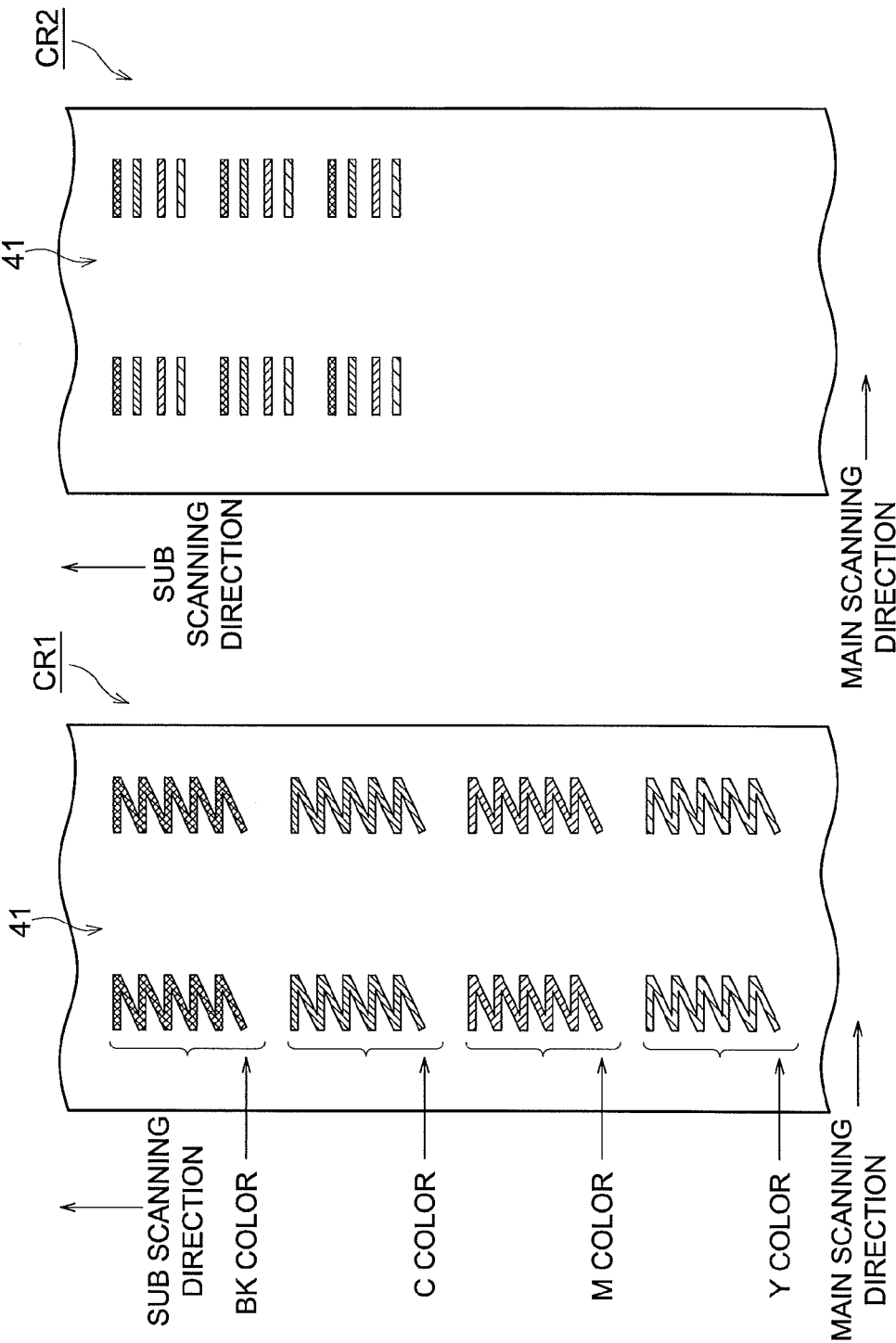
FIG. 4A is a plan view showing an example of the first color registration deviation detecting mark CR1 formed by main-and-sub mark forming section 85 in FIG. 3.
FIG. 4B is a plan view showing an example of the second color registration deviation detecting mark CR2 formed by sub-mark forming section 86 in FIG. 3.

As is shown in FIG. 4A, the first color registration deviation detecting mark CR1 is formed on intermediate transfer belt 41 for each color. In the example shown in FIG. 4A, the color registration deviation detecting marks are formed in the order of BK color, C color, M color and Y color. Further, they are formed on two lines on the front side and the rear side of the image forming apparatus. The first color registration deviation detecting mark CR1 has a form wherein line segments which are in parallel with the main scanning direction and line segments which make an angle of 45 degrees with the main scanning direction and the sub scanning direction are repeated. An example shown in FIG. 4A has a form wherein line segments which are in parallel for a single color and line segments which make an angle of 45 degrees are repeated five times. Further, a form of the first color registration deviation detecting mark CR1 for each color is formed to be the same.

As is shown in FIG. 4B, the second color registration deviation detecting mark CR2 is composed of line segments which are in parallel with the main scanning direction, and is formed on intermediate transfer belt 41 for each color. In the example shown in FIG. 4B, the color registration deviation detecting marks are arranged in the order of BK color, C color, M color and Y color. Further, they are formed on two lines including a line on the front side and a line on the rear side of the image forming apparatus. An amount of color registration deviation is calculated based on detecting timing of mark CR2 of the same color formed on the same line.

Figure 5:
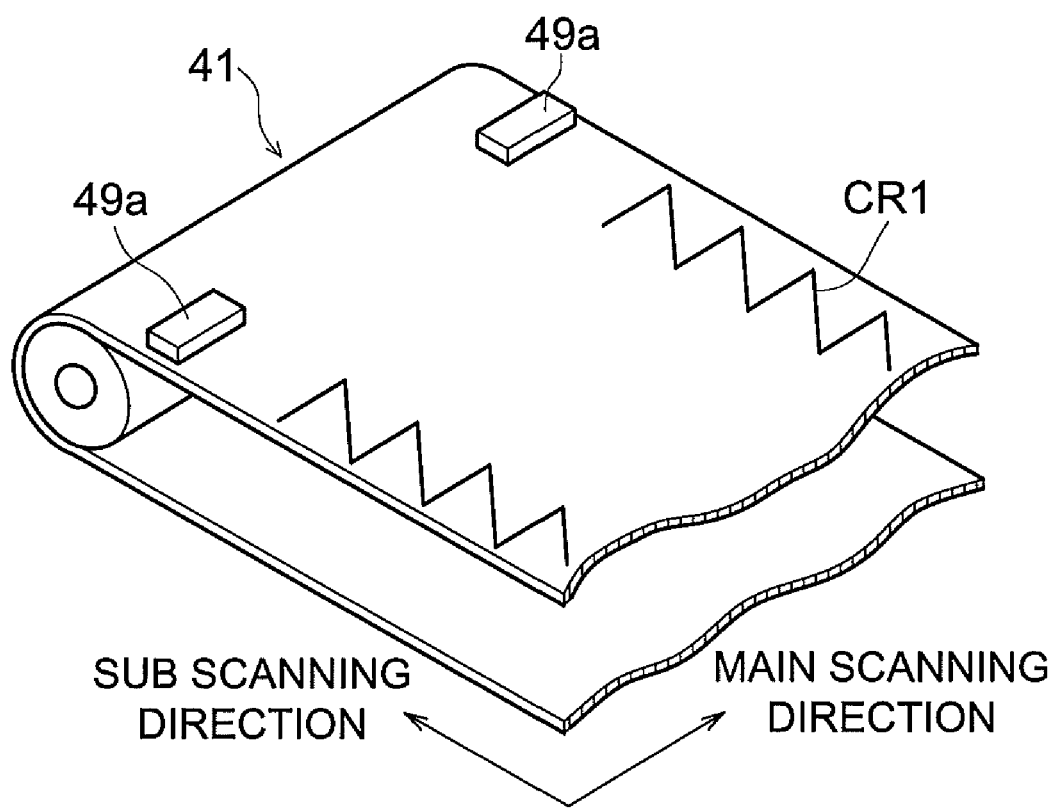
FIG. 5 is a perspective view showing how the first color registration deviation detecting mark CR1 formed on intermediate transfer belt 41 is detected by color registration sensors 49a and 49b.

FIG. 5 shows how the first color registration deviation detecting mark CR1 that is formed on intermediate transfer belt 41 and is shown in FIG. 4A is detected by color registration sensors 49a and 49b. Two color registration sensors 49a and 49b are arranged respectively on the front side and the rear side of the image forming apparatus to be adjacent to intermediate transfer belt 41, and they detect the first and second color registration deviation detecting marks which are formed on the intermediate transfer belt 41.

Binarization processing for image detecting signals S2 in the case when the first color registration deviation detecting mark CR1 is detected by color registration sensor 49a will be explained as follows, referring to FIGS. 6A-6H. Color registration sensor 49a shown in FIG. 6A detects edges of straight line section (i) and inclined section (ii) of the first color registration deviation detecting mark CR1 on intermediate transfer belt 41, and outputs image detection signals S2. In this example, an angle θ made by the straight line section (i) and by the inclined section (ii) is 45 degrees. Intermediate transfer belt 41 moves at a constant linear speed in the sub scanning direction. The color registration sensor 49a illuminates the first color registration deviation detecting mark CR1 with light from an unillustrated light emitting element, and detects its reflected light with a light-receiving element.

Figure 6A:
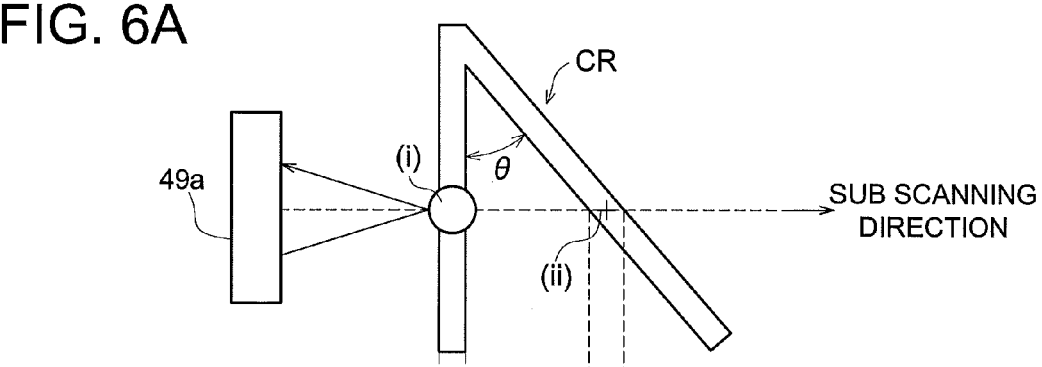
Figure 6B:
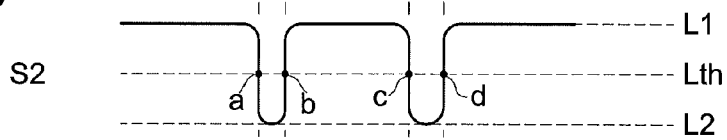
Figure 6C:
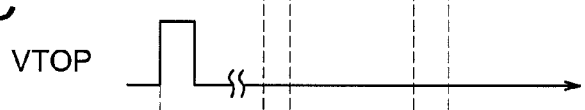
Figure 6D:
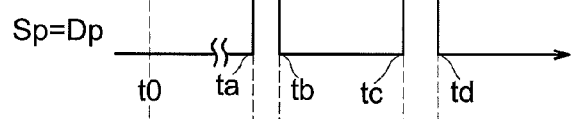
Figure 6E:
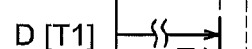
Figure 6F:
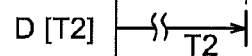
Figure 6G:
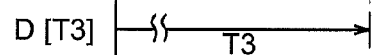
Figure 6H:
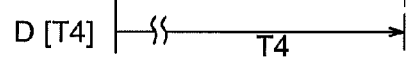

Image detecting signal S2 shown in FIG. 6B is obtained from color registration sensor 49a, and in this image detecting signal S2, L1 represents a detection level for intermediate transfer belt 41 surface. Lth represents a threshold value for binarizing the image detecting signal S2, and L2 represents a mark detecting level relating to the first color registration deviation detecting mark CR1. Point "a" is a point wherein the front edge of the straight section (i) is detected by color registration sensor 49; and threshold value Lth is crossed by the image detecting signal S2, and it gives the time ta of the aforesaid edge detection. At this detecting time ta for the front edge, first passage timing pulse signal Sp shown in FIG. 6D starts.

A point "b" is a point wherein the rear edge of the straight section (i) is detected in the same way, and threshold value Lth is crossed by the image detecting signal S2, and it gives the time tb of the rear edge detection time tb. At this time tb of rear end edge detection, passage timing pulse signal Sp shown in FIG. 7d falls.

In the same way, point "c" is a point wherein the front end edge of the inclined section (ii) is detected by color registration sensor 49; and threshold value Lth is crossed by the image detecting signal S2, and it gives the time tc of the front edge detection. At this time tc of the front edge detection, second passage timing pulse signal Sp shown in FIG. 7d starts.

A point "d" is a point wherein the rear end edge of the inclined section (ii) is detected in the same way, and threshold value Lth is crossed by the image detecting signal S2, and it gives the time td of the rear edge detection time td. At this time td of rear end edge detection, passage timing pulse signal Sp shown in FIG. 6D falls. Passage timing pulse signal Sp after this binarization becomes image detection data Dp. The image detection data Dp is used for calculation of an amount of deviation of writing positions for Y color, M color and C color for writing positions for the first color deviation detecting mark CR1 for BK color.

VTOP signals are signals (image leading end signals) that allow writing of the first color registration deviation detecting mark CR1 on photoreceptor drums 31Y, 31M, 31C and 31K. With respect to passage time T1, when writing start signals (VTOP signals) starts at time t0 shown in FIG. 6C, then, when an unillustrated counter is started, and after that, when the number of pulses of the reference clock signals is counted, and when front edge detection time to comes, the passage time T1 is obtained by an output value (passage time information D [T1] shown in FIG. 6E). In the same way, passage times T2, T3 and T4 are obtained by output values (passage time information D [T2], D [T3], D [T4] shown respectively in FIGS. 6E, 6F, 6G and 6H) outputted from the aforesaid counter when the counter further counts the pulse number of the reference clock signals, and when times tb, tc and td come. These pieces of passage time information D [T1]-D [T4] are stored in a memory section in controller 27.

Incidentally, even for color registration sensor 49b, the explanation for it will be omitted because the function is the same.

As shown in FIG. 7, the first color registration deviation detecting mark CR1 is composed of a line segment that is in parallel with the main scanning direction and of a line segment having an angle of θ=45 degrees for the main scanning direction. In this example, when an auxiliary line that is in parallel with the sub scanning direction is drawn from a point "e" representing a center of the line segment being in parallel with the main scanning direction, and when a point where the line segment having an angle of 45 degrees and the auxiliary line intersect is represented by "f", a length of the line segment between e and f is assumed to be Lb. In this example, it is possible to detect the magnification deviation in the main scanning direction of the first color deviation detecting mark CR1, by calculating a length Lb of the line segment between "e" and "f" based on a difference of detection times between point "e" and point "f" of the first color registration deviation detecting mark CR1.

Since the first color registration deviation detecting mark CR1 has a line segment that is in parallel with the main scanning direction and a line segment inclined from the main scanning direction, and the second color registration deviation detecting mark CR2 is composed only of a sine segment that is in parallel with the main scanning direction, it is possible to arrange second color registration deviation detecting marks CR2 in quantity of five in an area in the sub scanning direction equivalent in terms of an area to first color registration detecting marks CR1 in quantity of two. Therefore, as shown in FIG. 4B, an amount of toner consumption for the first color registration deviation detecting mark CR1 is greater than that for the second color registration deviation detecting mark CR2, because a size in the sub scanning direction of the first color registration deviation detecting mark CR1 is greater than that for the second color registration deviation detecting mark CR2. Therefore, the correcting time required for correcting color registration deviation in the main scanning direction is longer than correcting time needed for correcting color registration deviation in the sub scanning direction, and an amount of toner consumption grows greater.

Therefore, it is preferable that the first color registration deviation detecting mark CR1 is formed for correcting color registration deviation in the main scanning direction and in the sub scanning direction simultaneously, only when the color registration deviation in the main scanning direction has been generated, and the second color registration deviation detecting mark CR2 for correcting only color registration deviation in the sub scanning direction is formed when the color registration deviation in the main scanning direction is not generated.

The color registration deviation in the main scanning direction includes magnification deviation in the main scanning direction generated by temperature differences in exposure sections 2Y, 2M, 2C and 2K. As is shown in FIG. 9, magnification deviation in the main scanning direction grows greater when temperature differences in exposure sections 2Y, 2M, 2C and 2K grow greater. Therefore, CPU 84 in FIG. 3 can judge whether magnification deviation will be caused in the main scanning direction or not, based on temperatures of respective exposure sections 2Y, 2M, 2C and 2K detected by temperature sensors 92Y, 92M, 92C and 92K.

An example of a method of forming and controlling color registration deviation detecting mark CR1 and CR2 in the image forming apparatus in FIG. 1 will be explained as follows, referring to the flow chart in FIG. 11.

(1) First, in step S01, temperatures of respective exposure sections 2Y, 2M, 2C and 2K are detected by temperature sensors 92Y, 92M, 92C and 92K for respective colors. Then, the flow advances to S03 where judgment is formed whether the magnification deviation is caused in the main scanning direction or not, based on temperature differences of respective exposure sections 2Y, 2M, 2C and 2K detected by temperature sensors 92Y, 92M, 92C and 92K for respective colors.

(2) Specifically, one of exposure sections 2Y, 2M, 2C and 2K (for example, exposure section 2K) is assumed to be a reference exposure section, and temperature differences between this reference exposure section and all other exposure sections 2Y, 2M and 2C are obtained, and when at least one of these temperature differences is a prescribed threshold value or higher, magnification deviation is judged to be caused in the main scanning direction in the superposition of toner images for respective colors (YES in S03) to advance to S05. Incidentally, judgment for occurrence of magnification deviation may also be formed by obtaining the maximum value and the minimum value in temperatures of exposure sections 2Y, 2M, 2C and 2K, for example, and by checking whether a temperature difference between the maximum value and the minimum value is not less than a prescribed threshold value or not, without being limited to the aforesaid method.

(3) On the other hand, when both of the aforesaid temperature differences are less than the prescribed threshold value, magnification deviation in the main scanning direction is judged not to occur in superposition of toner images for respective colors (NO in S03), and a flow advances to S07.

(4) In step S05, first color registration deviation detecting mark CR1 that can detect color registration deviations in both the main scanning direction and the sub scanning direction simultaneously is formed on intermediate transfer belt 41, and in step S07, second color registration deviation detecting mark CR2 that can detect only color registration deviation in the sub scanning direction is formed on intermediate transfer belt 41.

(5) A flow advances to S09, and color registration sensors 49a and 49b are used to detect the first color registration deviation detecting mark CR1 or the second color registration deviation detecting mark CR2. Then, the flow advances to S11, and an amount of correction for color registration deviation in the main scanning direction or in the sub scanning direction is calculated based on timing of color registration deviation detecting mark CR1 or CR2 detected by the color registration sensor 49a or 49b.

(6) Then, the flow advances to S13, and timing of image forming in the main scanning direction, polygon CLK inputted in polygon motor drive board 65 in FIG. 2 and timing of image forming in the sub scanning direction are controlled based on the calculated amount of correction. At the same time, phase differences of polygon mirror 54 for respective colors are detected, and the phase differences are corrected.

(7) Specifically, when the first color registration deviation detecting mark CR1 is formed, timing of image forming in the main scanning direction and polygon CLK are adjusted based on the calculated amount of correction for color registration deviation in the main scanning direction. By adjusting polygon CLK for respective colors, magnification deviation in the main scanning direction can be corrected. On the other hand, when the second color registration deviation detecting mark CR2 is formed, timing of image forming in the sub scanning direction and phase differences of polygon mirror 54 for respective colors are adjusted based on an amount of correction of color registration deviation in the sub scanning direction calculated.

As explained above, an embodiment of the invention makes it possible to obtain the following functions and effects.

Only in the case when CPU 84 judges that magnification deviation in the main scanning direction occurs, there is formed the first color registration deviation detecting mark CR1 wherein a pattern width in the sub scanning direction is greater than that of the second color registration deviation detecting mark CR2, and more amount of toner is needed for forming a mark, and in the case other than the aforesaid occasion, there is formed the second color registration deviation detecting mark CR2. Therefore, when the second color registration deviation detecting mark CR2 is formed, it is possible to make a size in the sub scanning direction to be small and to make an amount of necessary toner to be small, whereby, it is possible to shorten color registration correcting time. It is further possible to reduce toner consumption in the case of color registration correcting time.

When a difference between temperatures for all temperatures in exposure sections 2Y, 2M, 2C and 2K for respective colors measured by respective temperature sensors 92Y, 92M, 92C and 92K is equal to or higher than a threshold value, CPU 84 judges that magnification deviation occurs in the main scanning direction in superposition of toner images for respective colors, while, when a difference between temperatures for all temperatures in exposure sections 2Y, 2M, 2C and 2K for respective colors measured by respective temperature sensors 92Y, 92M, 92C and 92K is less than a threshold value, CPU 84 judges that magnification deviation does not occur in the main scanning direction in superposition of toner images for respective colors. Owing to this, it is possible to judge accurately whether magnification deviation occurs in the main scanning direction or not, based on temperature differences in exposure sections 2Y, 2M, 2C and 2K for respective colors.

Though the present invention has been described as stated above, the statement and the drawings representing a part of the disclosure should not be construed to limit the invention. The present disclosure may clarify alternative embodiments, examples and application technologies for those having ordinary skill in the art.

Sub-mark forming section 86 may also form the second color registration deviation detecting mark CR2 at a position corresponding to in-between sheets on intermediate transfer belt 41, and main-and-sub forming section 85 may also form the first color registration deviation detecting mark CR1 after interrupting an image forming job. Owing to this, it is possible to form the second color registration deviation detecting mark CR2 even in the case of sheet feeding to correct color registration deviation in the sub scanning direction, thus, it is possible to form the second color registration deviation detecting mark CR2, without broadening a distance between sheets to be broader than an ordinary value. Therefore, it is possible to carry out color registration correction in the sub scanning direction without lowering productivity during a printing job.

A form of the first color registration deviation detecting mark CR1 is not limited to those shown in FIGS. 4A and 8A. For example, the first color registration deviation detecting mark CR1 can be separated into a straight line section and an inclined section, as shown in FIGS. 10A and 10B. Namely, straight line sections for BK color, C color, M color and Y color may be arranged in order to be adjacent to each other, and after that, inclined sections for BK color, C color, M color and Y color may be arranged in order to be adjacent to each other. Due to this, it is possible to make a length of a pattern in the sub scanning direction to be shorter than that in forms shown in FIG. 4A and FIG. 8A. Thus, it is further possible to shorten the color registration correcting time. Further, it is possible to reduce an amount of toner consumption in the case of color registration correction.

Though an inclination angle of the inclined section of the first color registration deviation detecting mark CR1 has been made to be 45 degrees, this inclination angle is not limited to this and it may also be other angles.

Though the explanation has been given to the occasion wherein the first color registration deviation detecting mark CR1 is a mark for detecting magnification deviation in the main scanning direction and color registration deviation in the sub scanning direction at the same time, the first color registration deviation detecting mark CR1 may also be a mark for detecting only magnification deviation in the main scanning direction.

The image forming apparatus of the invention may also be applied to a color printer, a color facsimile machine and a multifunctional peripheral of the foregoing, in addition to a color copying machine.

As stated above, the invention should be construed to include various embodiments which are not disclosed in the present specification. Therefore, the invention should be defined only by invention specific items relating to the appropriate claims of the present disclosure.

In the present embodiment of the invention, only when the magnification deviation is judged to occur in the main scanning direction, the first color registration deviation detecting mark wherein a pattern width in the sub scanning direction is greater than that of the second color registration deviation detecting mark, and an amount of toner needed for forming a mark is larger is formed, and in cases other than the aforesaid occasion, the second color registration deviation detecting mark is formed. Therefore, when forming the second color registration deviation detecting mark, color registration correcting time can be shortened because it is possible to make a size of a mark to be small in sub scanning direction and to make an amount of necessary toner to be small. Further, it is possible to reduce consumption volume of toner in the case of color registration correction.

In the present embodiment, it is possible to judge accurately, based on temperature differences in plural exposure sections, whether magnification deviation occurs or not in the main scanning direction.

In the present embodiment, it is possible to form the second color registration deviation detecting mark without broadening a distance between sheets to be broader than an ordinary value, because it is possible to correct color registration deviation by forming the second color registration deviation detecting mark even when a sheet is running. Therefore, it is possible to carry out color registration correction without lowering productivity in the course of printing.

As stated above, it is possible to make correcting time for color registration deviation to be short, and to make the consumption volume of toner in the case of correction of color registration deviation to be less.

What is claimed is:

1. An image forming apparatus that forms a color image by transferring toner images for respective colors formed on a plurality of rotary photoreceptor drums onto a sheet through an intermediate transfer member, the image forming apparatus comprising:
    (a) a plurality of exposure sections which form electrostatic latent images on the plurality photoreceptor drums respectively each of the plurality of exposure sections having a temperature sensor which measures temperature in the exposure section;
    (b) image forming sections that respectively form toner images for respective colors by developing the electrostatic latent images formed by the plurality of exposure sections;
    (c) an intermediate transfer section that transfers the toner images for respective colors formed by the image forming sections onto the intermediate transfer member through a superposition; and
    (d) a controller that controls operations of at least the plurality of exposure sections,
    wherein the controller judges whether magnification deviation is generated or not in a main-scanning direction in superposition of the toner images for respective colors according to the temperature measured by the temperature sensors, and
    wherein when a temperature difference between the plurality of exposure sections measured by the temperature sensors is greater than a prescribed threshold value, the controller judges that magnification deviation in the main-scanning direction is generated in the superposition of toner images for respective colors, the first color registration deviation detecting mark for detecting at least an amount of deviation in the main scanning direction is formed on the intermediate transfer member, and when the temperature difference between the plurality of exposure sections measured by the temperature sensors is less than the prescribed threshold value, the controller judges that the magnification deviation in the main-scanning direction is not generated in the superposition of toner images for respective colors, the second color registration deviation detecting mark for detecting only an amount of deviation in a sub scanning direction perpendicular to the main-scanning direction is formed on the intermediate transfer member.

2. The image forming apparatus of claim 1, wherein the controller forms the second color registration detecting mark at a position corresponding to a position between adjoining sheets on the intermediate transfer member while practicing an image forming job to form an image on a sheet when forming the second color registration deviation detecting mark, and the controller forms the first color registration deviation detecting mark after interrupting image forming job when forming the first mark.

3. The image forming apparatus of claim 1, wherein the controller establishes either one of the plurality of exposure sections to be a reference exposure section, and judges that the magnification deviation is generated in the main scanning direction in superposition of toner images for respective colors, when at least one of temperature differences between the reference exposure section and all other exposure sections is larger than a prescribed threshold value, and judges that the magnification deviation is not generated in the main scanning direction in superposition of toner images for respective colors, when all of temperature differences between the reference exposure section and all other exposure sections are less than the prescribed threshold value.

4. The image forming apparatus of claim 1, wherein the controller obtains a maximum value and a minimum value of temperatures of exposure sections measured by respective temperature sensors, and judges that the magnification deviation is generated in the main scanning direction in superposition of toner images for respective colors when a temperature difference between the maximum value and the minimum value is larger than a prescribed threshold value, and judges that magnification deviation is not generated in the main scanning direction in superposition of toner images for respective colors when the temperature difference between the maximum value and the minimum value is less than the prescribed threshold value.

* * * * *